United States Patent [19]
Bentley

[11] Patent Number: 5,709,143
[45] Date of Patent: Jan. 20, 1998

[54] ROUND BALER TWINE CUTTER

[75] Inventor: Paul Bentley, Gainesville, Tex.

[73] Assignee: Hay & Forage Industries, Hesston, Kans.

[21] Appl. No.: 560,273

[22] Filed: Nov. 21, 1995

[51] Int. Cl.$^6$ .......................... B65B 63/04; A01F 15/07; B26D 1/56

[52] U.S. Cl. .................... 100/5; 56/341; 83/346; 83/659; 83/950; 492/36

[58] Field of Search .................. 100/5, 13, 88; 83/346, 659, 950; 56/341; 289/14, 15; 492/28, 30, 36

[56] References Cited

U.S. PATENT DOCUMENTS

| | | | |
|---|---|---|---|
| 799,175 | 9/1905 | Luebben et al. | 100/13 |
| 2,519,355 | 8/1950 | Cox, Jr. | 492/36 |
| 3,554,068 | 1/1971 | Schwartz | 83/561 |
| 3,913,473 | 10/1975 | Meiers | 100/5 |
| 4,062,279 | 12/1977 | Grube et al. | 100/5 |
| 4,253,387 | 3/1981 | Schmitt et al. | 100/5 |
| 4,440,075 | 4/1984 | Gaeddert | 100/5 |
| 4,457,226 | 7/1984 | Meiers | 100/5 |
| 4,612,855 | 9/1986 | Wagstaff et al. | 100/5 |
| 4,691,606 | 9/1987 | Johnson et al. | 83/346 |
| 4,716,801 | 1/1988 | Spaller, Jr. | 83/346 |
| 4,729,213 | 3/1988 | Raes | 56/341 |
| 4,782,652 | 11/1988 | White | 56/341 |
| 5,184,545 | 2/1993 | Jennings et al. | 100/5 |
| 5,231,828 | 8/1993 | Swearingen et al. | 56/341 |
| 5,259,283 | 11/1993 | Michalik | 83/347 |

FOREIGN PATENT DOCUMENTS

| | | | |
|---|---|---|---|
| 2241402 | 3/1975 | France | 492/36 |
| 808418 | 2/1959 | United Kingdom | 83/346 |

*Primary Examiner*—Stephen F. Gerrity
*Attorney, Agent, or Firm*—Hovey, Williams, Timmons & Collins

[57] ABSTRACT

The twine cutter includes an anvil and swingable knife on opposite sides of the path of travel of the taut twine so that when the knife swings into cutting engagement with the anvil, the twine is severed. The anvil is rotatably mounted to the baler for shedding crop material and trash which would otherwise interfere with the cutting engagement of the knife and anvil. The anvil preferably presents a cylindrical cutting surface having circumferential V-shaped grooves which deflect the twine around the knife when the knife swings into engagement with the anvil for enhancing the cutting action of the twine cutter.

36 Claims, 2 Drawing Sheets

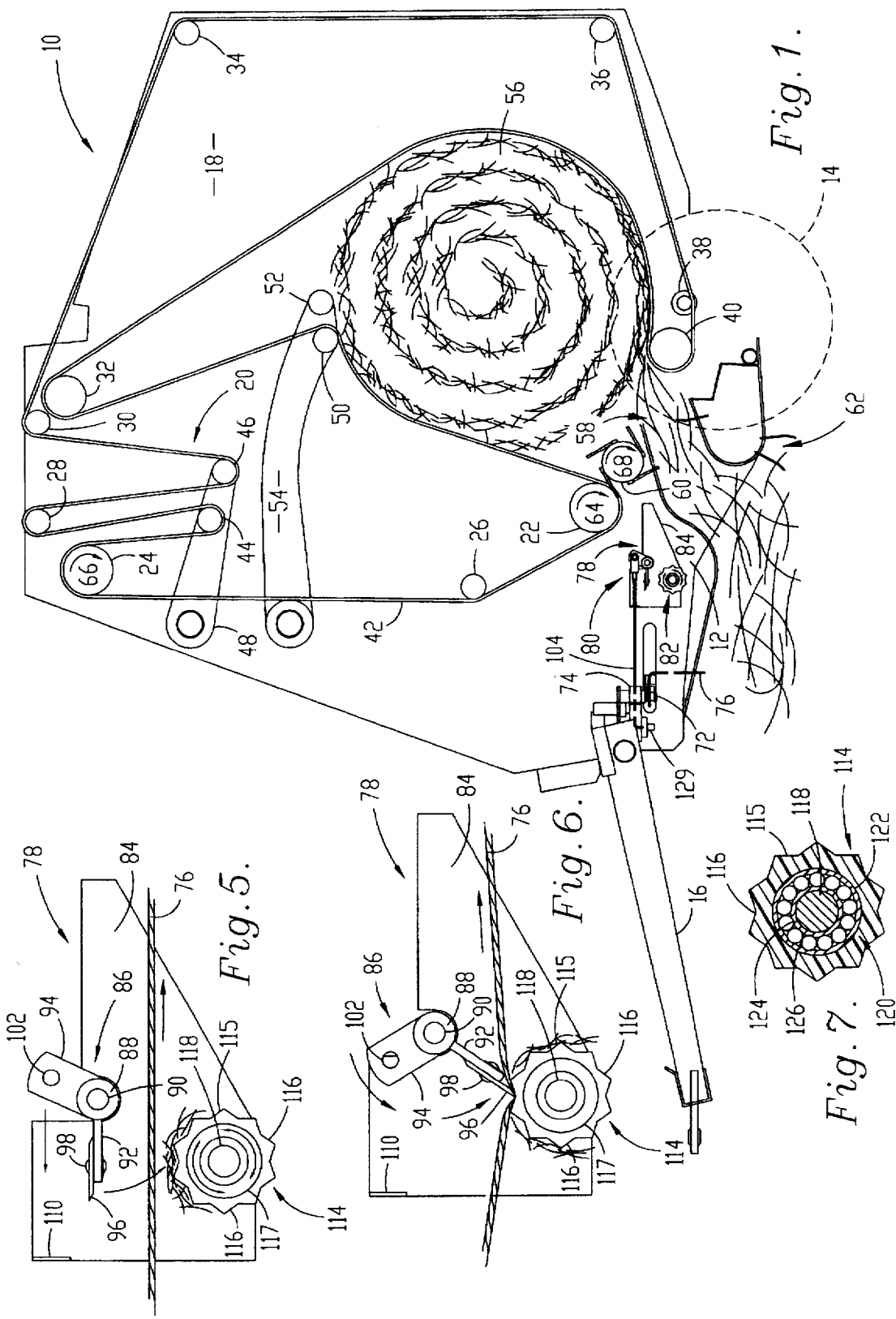

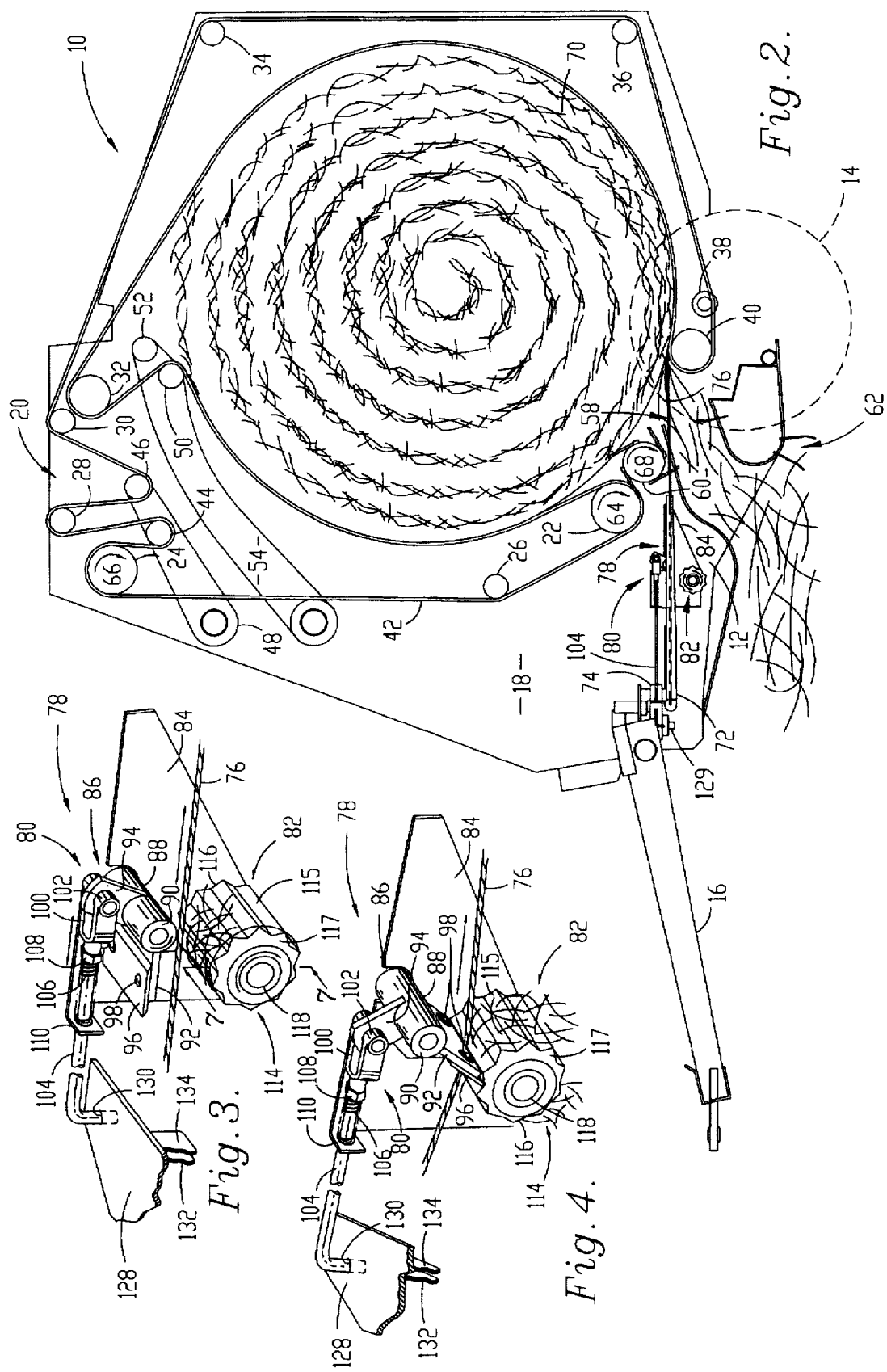

ROUND BALER TWINE CUTTER

BACKGROUND OF THE INVENTION

1. Field of the Invention

The present invention relates generally to round balers and, more particularly, to an improved twine cutter for severing twine used to wrap a finished bale that minimizes interference with curing operations caused by accumulation of crop material and trash in the vicinity of the cutter.

2. Discussion Of Prior Art

Conventional twine cutters having a knife shiftable into engagement with a stationary anvil for severing twine located therebetween are sometimes ineffective and unreliable, particularly in high trash conditions. Specifically, such debris tends to collect on the stationary anvil and interfere with the cutting engagement of the knife with the anvil. Furthermore, conventional anvils have generally smooth cutting surfaces which quickly become worn necessitating replacement thereof. Conventional twine cutters also fail to effectively utilize the operational movement of the knife to enhance the curing action thereof.

Such inability to fully and cleanly sever the twine after the completion of a wrapping cycle is detrimental to baling operations and may be damaging to the baler itself. If the cutter fails to sever the twine, the operator must first become aware of such mechanical failure, then climb down off the tractor, walk back to the baler, and perform the tedious task of manually severing the twine in preparation for continuing the baling process. Of course, if the operator fails to realize that the twine has not been severed, the wrapped bale will be discharged upon initiation of the discharge cycle, but will take with it a stream of twine that continues to pull additional twine from the spool as the baling process resumes. It is also possible that failure to sever the twine from the source of supply may lead to jam ups in the machine and subsequent mechanical breakdown.

OBJECTS AND SUMMARY OF THE INVENTION

Accordingly, an important object of the present invention is to provide a reliable, effective twine cutter that minimizes interference with curing operations caused by accumulation of crop material and trash in the vicinity of the cutter. Another object of the present invention is to provide a reliable twine cutter that ensures severance of the twine so that baling operations are not affected. The present invention also provides a twine cutter that crimps and pinches the twine upon severance thereof to improve the cutting action of the cutter. Further, an object of the present invention is to improve upon conventional balers by reducing shut-down time associated with conventional twine cutters, as hereinabove identified.

In accordance with these and other objects evident from the following description of a preferred embodiment of the invention, the round baler has an improved twine cutter for cutting the twine at a point between the wrapping mechanism and the bale within the baling chamber. The cutter includes an anvil and an opposed knife on opposite sides of the path of travel of the twine. The knife and anvil are relatively interengagable for severing the twine located therebetween. Moreover, the anvil is rotatably mounted to the baler for shedding crop material and trash which would otherwise collect thereon and interfere with the cutting interengagement of the knife and anvil.

Preferably, the knife is selectively swingable towards the anvil for effecting the cutting interengagement. The anvil is freely rotatable so that vibrations during the twine wrapping cycle and otherwise cause slight rotation of the anvil, whereby the anvil sheds itself of trash and is essentially self-cleaning. Additionally, as the twine is drawn towards the finished bale, it engages and effects rotational movement of the anvil to clean off the anvil.

As the twine emanates from the dispensing tube and is drawn onto the bale by the rotating bale itself, the twine drags across the top of the anvil and causes the anvil to turn in the direction of the moving twine. When the knife then swings down generally in the same direction as the moving twine and strikes the anvil, a stationary cutting nip is abruptly formed between the knife and the anvil so that the twine is stretched taut between the cutter and the bale. As the twine is pinched tightly against the anvil by the sharp edge of the knife, the twine severs. In the preferred cutter, the twine serves to rotate the anvil in a direction opposite to swinging of the knife so that the anvil and knife nip or pinch the twine to enhance the cutting action of the cutter. V-shaped grooves in the surface of the anvil deflect the twine around the knife edge when the knife swings into engagement with the cutting surface to further enhance the cutting action of the cutter.

BRIEF DESCRIPTION OF THE DRAWING FIGURES

A preferred embodiment of the invention is described in detail below with reference to the attached drawing figures, wherein:

FIG. 1 is a vertical cross-sectional view of a round baler having a twine cutter constructed in accordance with the principles of the present invention, the near sidewall being removed to reveal internal details of baler construction;

FIG. 2 is a vertical cross-sectional view similar to FIG. 1, but illustrating a finished bale within the baling chamber and the twine disposed in a dispensing position;

FIG. 3 is an enlarged, fragmentary, isometric view of the twine cutter depicted in FIG. 1, particularly illustrating the knife in a standby position;

FIG. 4 is an enlarged, fragmentary, isometric view similar to FIG. 3, but illustrating the knife swung downwardly into engagement with the anvil to cut the twine located therebetween;

FIG. 5 is a side elevational view of the twine cutter in the FIG. 3 position;

FIG. 6 is a side elevational view of the twine cutter in the FIG. 4 position; and FIG. 7 is a vertical cross-sectional view taken along line 7—7 of FIG. 3, particularly illustrating the structure for rotatably mounting the anvil to the baler.

DETAILED DESCRIPTION OF THE PREFERRED EMBODIMENT

Turning now to the drawings, the round baler 10 selected for illustration generally includes a chassis 12 having ground wheels 14 and a forwardly extending tongue 16 that is adapted for connection with a towing vehicle (not shown). The chassis 12 carries a pair of upright, laterally spaced sidewalls 18 (the near sidewall being removed in FIGS. 1–2) which cooperate to define a space within which bale forming and bale wrapping operations may be carried out as the baler is advanced across a field. Within the space defined by the sidewalls 18, the baler 10 further includes bale forming mechanism 20 for compacting and rolling crop material into a round bale.

In the illustrated embodiment, the bale forming mechanism 20 and sidewalls 18 cooperate to define a "variable chamber", wherein the baling chamber is initially relatively small but then grows progressively larger as the bale increases in diameter within the baler 10. It will be appreciated, however, that the principles of the present invention are equally applicable to a "fixed chamber" machine in which the dimensions of the baling chamber are at least substantially constant throughout the baling cycle, with the diameter of the chamber corresponding substantially with the diameter of the full size bale when completed.

With the forgoing caveat in mind, the bale forming mechanism 20 of the variable chamber baler illustrated herein includes a series of cooperating belts and rolls supported by the sidewalls 18 for rolling and compacting a bale as it forms within the baler 10. Turning particularly to FIG. 1, the baler 10 is provided with a plurality of laterally extending, stationary rolls including a lower drive roll 22, upper drive roll 24, idler rolls 26,28,30,32,34,36, a trash clearing roll 38, and a support roll 40. The stationary rolls 22–40 span the sidewalls 18 in a general circular pattern viewing FIG. 1 for guiding a plurality of endless, laterally spaced, side-by-side belts 42 as the belts 42 are driven linearly during bale formation and wrapping.

The bale forming mechanism further includes a pair of movable slack takeup rolls 44 and 46 mounted near the upper portion of the baler 10 on downwardly spring biased arm structure 48 to maintain tension on the belts 42, yet permit the paying out of stored slack as the bale increases in diameter during formation. Near the fore-and-aft center of the baler 10, the belts 42 are looped under the lower drive roll 22, over the upper idler roll 38, and under the support roll 40 to present a pair of opposed, front and rear runs 42a and 42b, which are initially generally upright, but which become bowed out in fore-and-aft directions, as illustrated in FIGS. 1-2, as the bale grows beyond its initial starting core dimensions. A pair of retaining rolls 50 and 52 are mounted on a second swingable arm structure 54 that is also spring biased downwardly; the retaining rolls 50,52 receiving the belt runs 42a and 42b therebetween so as to form a baling chamber 56 between the runs 42a, 42b which is bounded at the sides by the sidewalls 18.

Although not illustrated, it will be appreciated that the chamber 56 initially assumes a generally upright, somewhat triangular configuration with the retaining rollers 50, 52 at the apex of the chamber 56. Thereafter, the chamber 56 becomes distended and circular in transverse configuration as the growing bale pushes forwardly on the belt run 42a and rearwardly on the belt run 42b to cause additional slack to be paid out and for the arm 54 to rise as additional hay is progressively added to the bale. In comparing FIG. 1 with FIG. 2, it will be observed that the baling chamber 56 grows progressively larger as hay is delivered thereto.

The chamber 56 is open at the bottom to present a crop infeed entrance 58 that is defined between the support roll 40 and a starter roll 60. If desired, the starter roll 60 is similar in principle to the construction disclosed in U.S. Pat. No. 4,782,652, entitled ROUND BALER HAVING ANTI-PLUGGING MEANS, assigned of record to the assignee of the present invention. A crop pickup mechanism 62, supported generally below the entrance 58 and forwardly of the support roll 40, is operable to lift crop material off the field as the baler 10 is advanced and to feed the material into the chamber 56 via the entrance 58.

The drive rolls 22 and 24 are drivingly coupled with the power source of the towing vehicle to rotate in clockwise directions viewing FIG. 1, as indicated by arrows 64 and 66, respectively. Thus, when the baling chamber 56 is in its initial upright condition, the drive rolls 22 and 24 drive the belts 42 so that the front run 42a is moving generally downwardly and forwardly while the rear run 42b is moving generally upwardly. Consequently, hay introduced into the chamber 56 via the entrance 58 is acted upon by the upwardly moving rear run 42b and the downwardly moving front run 42a so as to tumble forwardly and coil into a growing bale. Assisting in the initial starting of the core and the coil-up action is the starting roller 60 which is driven in a clockwise direction viewing FIG. 1, as indicated by arrow 68. The baling cycle is complete when a sufficient amount of hay has been delivered to the chamber 56 to have formed a bale 70 as depicted in FIG. 2.

Once the baling cycle is complete, it is desirable that the fully formed bale 70 be tightly wrapped with twine. The illustrated baler 10 is provided with a twine dispensing tube 72 located adjacent the front of the baler. The dispensing tube 72 sits in a home position during the baling cycle, yet is supported for horizontal, fore-and-aft swinging movement by a support mechanism 74. FIG. 1 illustrates the tube 72 moved slightly out of its home position with the knife raised. The wrapping cycle begins when the tube 72 swings from the home position to dispense a strand of twine 76, which is threaded from a spool (not shown) through the tube 72 and drawn rearwardly into the baling chamber 56 by the rolling bale 70, as shown in FIG. 2. The tube 72 swings between the sidewalls 18 during the wrapping cycle to wrap the twine 76 in a generally helical pattern about the bale 70. Once the bale 70 has been sufficiently wrapped, the twine dispensing tube 72 swings back into the home position, whereby a twine cutter 78 (the structure and operation of which will be described below) cuts the twine 76. After the twine 76 is severed by the cutter 78, the bale may be discharged.

TWINE CUTTER 78

Turning particularly to FIG. 3, the preferred twine cutter 78 generally includes a knife assembly 80 and an anvil assembly 82 which cooperate to cut the twine 76. A support plate 84 carries the assemblies 80,82 and is mounted to the fight sidewall 18.

Particularly, the knife assembly 80 includes a crank member 86 having a central sleeve 88 rotatably received on a stub shaft 90, a radial tab portion 92 projecting from the sleeve 88, and a crank arm 94 extending obtusely relative to the tab portion 92. A steel cutting blade 96 is carded for swinging movement by the tab portion 92. Preferably, the blade 96 is removably attached to the tab portion 92 by threaded fasteners 98 for facilitating replacement of the blade 96. On the other hand, the crank arm 94 is pivotally coupled with a clevis 100 by a pin fastener 102. The clevis 100 serves to transmit axial shifting of an L-shaped pull-rod 104 to the crank arm 94. As shown in FIG. 3, a compression spring 106, which is held between a threaded coupling 108 and a retainer clip 110, biases the pull-rod 104 forwardly to dispose the blade 96 in a standby position.

The anvil assembly 82 preferably includes an anvil body 114 spaced below the knife assembly 80 which presents a generally cylindrical, peripheral cutting surface 115 having a number of circumferentially spaced V-shaped grooves 116. As perhaps best shown in FIG. 7, each V-shaped groove 116 is formed of a pair of outwardly diverging faces that cooperatively define an angle greater than 90 degrees for ensuring proper interaction between the cutting blade 96 and cutting surface 115. Preferably, the angle defined between the faces of each V-shaped groove 116 is approximately 140 degrees. Further, the inboard end 117 of the anvil body 114 is beveled along the outer margin thereof for purposes which will subsequently be described. Preferably, the anvil is formed of a material which is softer than the steel blade 96, such as a hard rubber material or aluminum.

The anvil body 114 is rotatably mounted to a jack-shaft 118 of the support plate 84. A pre-packed bearing assembly 120 having an outer race 122 secured to the anvil body 114, a concentric inner race 124 press-fit onto the shaft 118, and a ball-bearing ring 126 interposed therebetween is provided to support the anvil body 114 on the shaft 118 for free rotation. However, it is within the ambit of the present invention to provide mechanism for drivingly rotating the anvil body 114. In either case, it will be appreciated that rotation of the anvil body 114 sheds crop material and trash from the cutting surface 115 which would otherwise collect thereon.

An actuating lever 128 is coupled with the knife assembly 80 to swing the blade 96 counterclockwise (viewing FIGS. 5–6) out of its standby position and into cutting engagement with the cutting surface 115 when the twine dispensing tube 72 returned to its home position. Particularly, the lever 128 is swingably supported by the baler 10 at pivot 129 (FIGS. 1 and 2) and includes an opening 130 at the swinging end thereof which receives the depending leg of the pull-rod 104 so that swinging movement of the lever 128 imparts axial shifting to the pull-rod 104, and vice versa. Extending along the underside of the lever 128 are a pair of leaf springs 132,134, which are disposed to be engaged by the twine dispensing tube 72 as it moves to the home position, for the purpose of operating the lever 128. As the tube 72 approaches the home position, it pushes against the leaf springs 132,134 and swings the lever 128 forwardly (or leftwardly viewing FIG. 2) to pull on the rod 104.

OPERATION

During the baling cycle, the twine dispensing tube 72 rests in the home position such that the blade 96 is swung into engagement with the surface 115, whereby rotation of the anvil body 114 is prevented. However, during the wrapping cycle, wherein the tube 72 is out of its home position and swinging between the sidewalls 18, the blade 96 disengages the anvil body 114. Accordingly, the anvil body 114 is free to rotate during the wrapping cycle to shed debris from the cutting surface 115. Such rotation may be due in part to vibrations caused by operation of the various baling components. As the tube 72 swings across the front of the bale, the dangling end of the twine becomes enmeshed with the crops flowing into the baler such that the twine is presented to the bale. Because the bale is spinning, the bale draws twine out of the tube and wraps itself with the twine as the tube is swung back and forth across the front of the bale chamber.

Upon completion of the wrapping cycle, the tube 72 returns to the home position. As the tube approaches home, it swings generally towards the twine cutter 78 and places the twine 76 between the knife assembly 80 and anvil assembly 82. The twine may drag across the anvil 82 at this time, and if it does, the motion of the twine as it flows toward the bale causes the anvil to rotate and dump its accumulated trash. The inboard end 117 of the anvil body 114 is beveled to prevent the twine 76 from catching on the end 117 as the tube 72 swings into the home position.

As the tube 72 arrives at its home position, it engages the operating lever 128 and pushes it forwardly to pull on rod 104. This swings the blade 96 downwardly and rearwardly toward the anvil and pinches the twine against the anvil surface 115. The twine stops abruptly, stretches taut between the cutter and the bale, and severs.

It will be appreciated that the rearwardly moving twine 76 tends to pull the downwardly and rearwardly moving blade 96 tightly into engagement with the cutting surface 115. This promotes more effective severance.

Moreover, just prior to severance of the twine 76, the twine 76 contacts the surface 115 which rotates the anvil body 114 slightly in the clockwise direction viewing FIGS. 5–6. Thus, the operation of the twine cutter 78 ensures that all debris has been removed from the cutting surface 115 before the blade 96 engages the surface 115.

Before the tube 72 reaches its home position, the blade 96 swings into engagement with the cutting surface 115, which prevents further swinging of the lever 128 in the forward direction. However, the tube 72 continues to swing towards the home position and yieldably flexes the leaf springs 132,134, whereby the flexed leaf springs provide a residual bias for ensuring interengagement of the blade 96 with the surface 115 and for tolerating manufacturing inaccuracies and "slop" due to wear. When the twine dispensing tube 72 swings out of the home position, it operably disconnects from the actuating lever 128, which allows the spring 106 to shift the pull-rod 104 rearwardly and in turn swing the blade 96 to its standby position.

It will be appreciated that the unique construction of the anvil body 114 further ensures severance of the twine 76. In this respect, as best shown in FIG. 6, the tip of the blade 96 usually engages the cutting surface 115 at the apex of one of the grooves 116 due to the "self-centering" action of the anvil as the knife and twine move down into and along the side of a groove. This causes the twine to become severely crimped around the edge of the knife blade as the cutting action is carried out, promoting severance. Additionally, it will be seen that because the blade 96 swings down in a direction generally opposite to rotation of the anvil body 114, rearward twine movement only tends to tighten the knife even tighter against the anvil.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the principles of the present invention are equally applicable to a round baler employing dual twine dispensing tubes, in which two twine cutters are used. Furthermore, it is entirely within the scope of the present invention to actuate the knife assembly with structure other than the twine dispensing tube, such as a pull cord manually operated by the farmer. Moreover, the twine 76 may be disposed to skim along the cutting surface 115 when the tube 72 is in the home position so that the anvil body 114 is rotated by the twine 76 until the blade 96 engages the surface 115.

The inventor hereby states his intent to rely on the Doctrine of Equivalents to determine and assess the reasonably fair scope of his invention as pertains to any apparatus not materially departing from but outside the literal scope of the invention as set out in the following claims.

What is claimed is:

1. In a round baler having wrapping mechanism for wrapping successive bales formed within the baler with twine, an improved cutter for cutting the twine at a point between the mechanism and the bale comprising:

an anvil on one side of the path of travel of the twine; and a knife on an opposite side of the path of travel of the twine, said knife and anvil being relatively interengagable for cutting the twine located therebetween, said anvil being rotatable for shedding debris.

2. In a round baler as claimed in claim 1, said anvil being freely rotatable.

3. In a round baler as claimed in claim 2, said anvil being rotated by the twine as it is drawn towards the bale.

4. In a round baler as claimed in claim 3, said knife being selectively shiftable towards the anvil for effecting the cutting interengagement.

5. In a round baler as claimed in claim 4, said anvil being spaced from the twine as the latter is drawn towards the bale during wrapping thereof, said knife moving the twine into engagement with the anvil when the knife shifts towards the anvil, whereby the anvil is rotated just prior to severance of the twine.

6. In a round baler as claimed in claim 1, said knife being selectively shiftable towards the anvil for effecting the cutting interengagement.

7. In a round baler as claimed in claim 6, said anvil presenting an axis of rotation, said knife being swingable about an axis generally parallel to the axis of rotation of the anvil.

8. In a round baler as claimed in claim 7, said anvil rotating in a direction generally opposite to a swinging direction of the knife to pinch the wrapping material therebetween.

9. In a round baler as claimed in claim 8, said anvil being freely rotatable.

10. In a round baler as claimed in claim 9, said direction of rotation of the anvil being effected by the twine as it is drawn towards the bale.

11. In a round baler as claimed in claim 10, said anvil being spaced from the twine as the latter is drawn towards the bale during wrapping thereof, said knife moving the twine into engagement with the anvil when the knife swings towards the anvil, whereby the anvil is rotated in the opposite direction just prior to severance of the twine.

12. In a round baler as claimed in claim 11, said anvil presenting a generally cylindrical cutting surface having a plurality of corrugations configured to receive the knife when the knife swings into engagement with the cutting surface.

13. In a round baler as claimed in claim 12, said corrugations comprising circumferentially spaced V-shaped grooves which deflect the twine around the knife when the knife swings into engagement with the cutting surface.

14. In a round baler as claimed in claim 8, said anvil presenting a generally cylindrical cutting surface having a plurality of corrugations configured to receive the knife when the knife swings into engagement with the cutting surface.

15. In a round baler as claimed in claim 14, said corrugations comprising circumferentially spaced V-shaped grooves which deflect the twine around the knife when the knife swings into engagement with the cutting surface.

16. In a round baler as claimed in claim 6, said knife being spring biased away from the anvil into a standby position.

17. In a round baler as claimed in claim 16, and a pivotal twine dispensing tube for dispensing twine in a generally helical pattern about a bale, said tube disposed to pivot into a home position wherein the twine is placed between the anvil and knife prior to cutting of the twine, said tube being operably coupled with the knife to shift the knife out of its standby position and into engagement with the anvil when the tube is in the home position.

18. In a round baler as claimed in claim 1, said anvil presenting a generally cylindrical cutting surface having a plurality of corrugations configured to receive the knife when the knife and anvil are interengaged.

19. In a round baler as claimed in claim 18, said corrugations comprising circumferentially spaced V-shaped grooves which deflect the twine around the knife when the anvil and knife are interengaged.

20. In a round baler as claimed in claim 19, said anvil being freely rotatable.

21. In a round baler as claimed in claim 20, said anvil being rotated by the twine as it is drawn towards the bale.

22. In a round baler as claimed in claim 21, said knife being selectively shiftable towards the anvil for effecting the cutting interengagement.

23. In a round baler as claimed in claim 22, said anvil being spaced from the twine as the latter is drawn towards the bale during wrapping thereof, said knife moving the twine into engagement with the anvil when the knife shifts towards the anvil, whereby the anvil is rotated just prior to severance of the twine.

24. In a round baler as claimed in claim 1, said anvil being softer than the knife.

25. In a round baler as claimed in claim 1, said knife being disposed above the anvil so that debris shed from the anvil is prevented from collecting on the knife.

26. A twine cutter for attachment to a round baler, wherein the baler has mechanism for wrapping successive bales formed therein with twine, said cutter comprising:

a rotatable anvil mountable to the baler on one side of the path of travel of the twine; and a knife mountable to the baler on an opposite side of the path of travel of the twine for swinging movement towards the anvil, said knife and anvil cooperating to sever twine located therebetween when the knife swings into engagement with the anvil.

27. A twine cutter as claimed in claim 26, said anvil presenting a generally cylindrical cutting surface having a plurality of corrugations configured to receive the knife when the knife swings into engagement with the cutting surface.

28. A twine cutter as claimed in claim 27, said corrugations comprising circumferentially spaced V-shaped grooves which deflect the twine around the knife when the knife swings into engagement with the cutting surface.

29. A twine cutter as claimed in claim 27, said cutting surface being softer than the knife.

30. A twine cutter for attachment to a round baler, wherein the baler has mechanism for wrapping successive bales formed therein with twine, said cutter comprising:

a rotatable anvil mountable to the baler on one side of the path of travel of the twine; and a knife mountable to the baler on the other side of the path of travel of the twine, said knife and anvil being configured to sever twine located therebetween when the knife and anvil are interengaged, said anvil having a generally cylindrical, corrugated cutting surface for receiving the knife when the anvil and knife are interengaged.

31. A twine cutter as claimed in claim 30, the corrugations of said cutting surface comprising circumferentially spaced V-shaped grooves which deflect the twine around the knife when the knife and anvil are interengaged.

32. A twine cutter as claimed in claim 30, said cutting surface being softer than the knife.

33. A rotatable anvil for use with a twine cutting knife of a round baler, said anvil comprising:

a generally cylindrical body having a corrugated, peripheral cutting surface for receiving the knife when the anvil and knife are interengaged, said corrugated curing surface comprising circumferentially spaced V-shaped grooves, each of said grooves being formed of a pair of outwardly diverging faces that cooperatively define an angle greater than 90 degrees.

34. An anvil as claimed in claim 33, said cutting surface being formed of aluminum.

35. An anvil as claimed in claim 33, said body having a central mounting hole defining the axis of rotation of the body.

36. An anvil as claimed in claim 33, said cutting surface being formed of a rubber material.

* * * * *